United States Patent Office 2,981,699
Patented Apr. 25, 1961

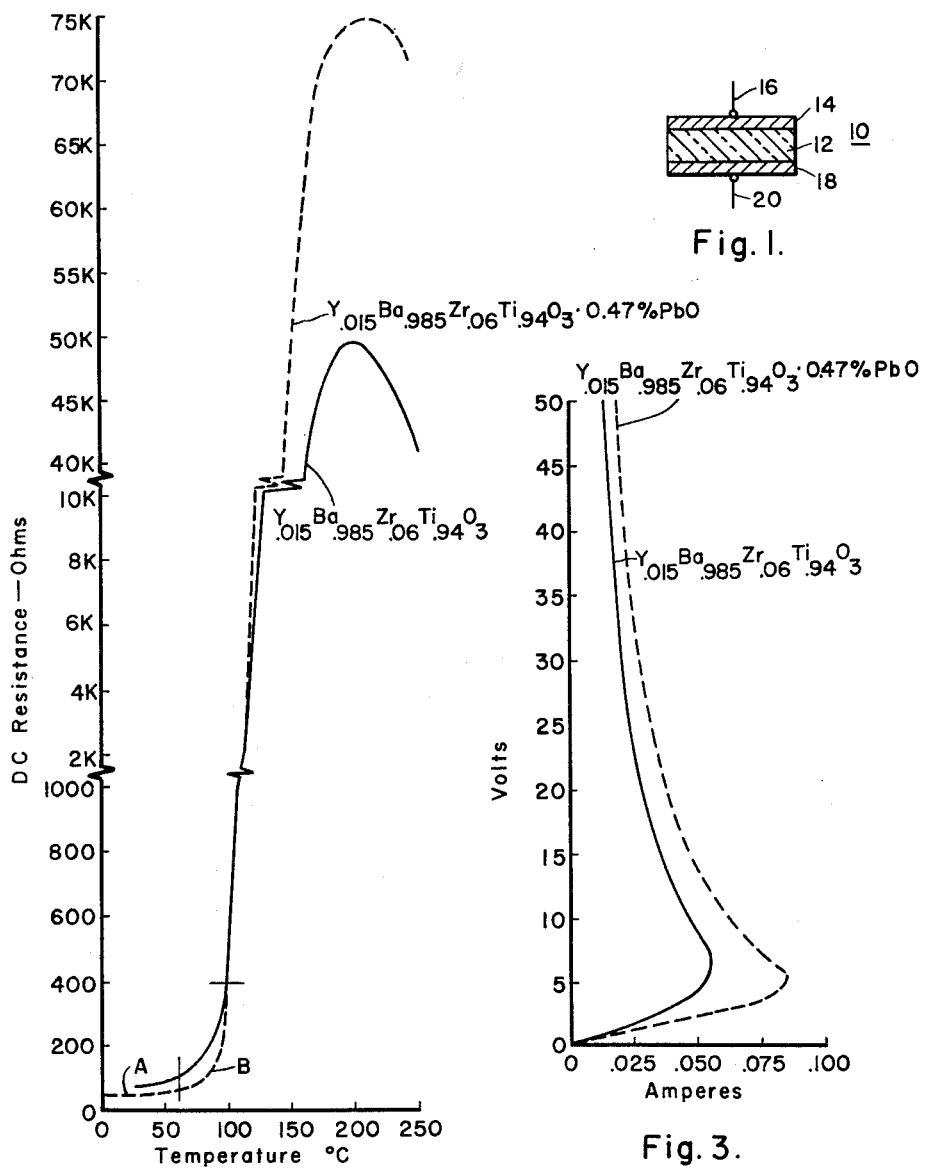

2,981,699

POSITIVE TEMPERATURE COEFFICIENT
THERMISTOR MATERIALS

Yoshio Ichikawa, Turtle Creek, Pa., assignor to Westinghouse Electric Corporation, East Pittsburgh, Pa., a corporation of Pennsylvania Filed Dec. 28, 1959, Ser. No. 862,248

10 Claims. (Cl. 252—520)

This invention relates to thermistors comprising ceramic bodies having a high positive temperature coefficient of electrical resistance and processes for preparing them.

Ceramic semiconductor materials are generally known as possessing negative temperature coefficients of resistance, that is, the electrical resistance decreases as the temperature increases. More recently there have been disclosed some materials which have positive temperature coefficients of resistance. However, these materials such as those disclosed in British 714,965 are characterized by only a moderate change in resistance per degree centigrade. In other words, it requires a substantial change in temperature before a marked change in total resistance occurs.

Furthermore, the known materials are characterized by variability of resistivity at any temperature level. In employing such semiconductor materials for temperature control purposes, the variability is so great that individual corrections must be applied to the material in each device employing them.

It would be desirable to have available a material that has a relatively constant predetermined resistivity over a range of temperatures, for example, at room temperature, and then a sudden increase in resistance within a selected range of temperatures and almost abruptly reaches a resistance from 10 to 100 times greater in a matter of a few degrees. The room temperature resistivity should be controllable within rather close limits and the temperature at which the resistance begins to rise abruptly likewise should be readily preselected and controllable with considerable accuracy so that individual calibrations and adjustments are not required for each device employing them.

Thermally sensitive ceramic bodies having a negative coefficient temperature of resistance are commonly called "thermistors." Such thermistors are widely employed in electrical and electronic equipment for measuring temperatures, controlling temperatures, controlling voltage for stabilization of electrical current, for making thermal conductivity measurements and in numerous other applications. A thermistor material with a marked positive temperature coefficient of electrical resistance would be highly desirable for use in electronics and electrical equipment, since it would in many cases increase the accuracy of the devices and simplify their construction. It is particularly desirable that these positive temperature coefficient thermistor materials be characterized by a very abrupt rise in resistance in a range of a few degrees of temperature from a relatively constant low resistance to an extremely high resistance. With such thermistor materials, marked improvement in the electric devices could be made with considerable increase in sensitivity of the devices. Furthermore, much more precise and accurate control could be effected by use of such improved materials.

In my application Serial No. 735,045, filed May 13, 1958, I have disclosed thermistors which have excellent positive temperature coefficients of electrical resistance and further may be so proportioned that within certain ranges of values the low temperature resistance values may be selected as desired. However, there are certain improvements in the device characteristics which would be desirable. These are: a lower room-temperature resistivity that is relatively constant over a rather wide range of temperatures short of the point where the resistivity increases rapidly, an increased power handling capacity, larger incremental changes in electrical resistance with small changes in temperature in the temperature range where the resistivity increases rapidly, an increased maximum resistivity, and a higher degree of reproducibility respecting uniformity and constancy of properties as compared to the body of the composition disclosed in the before mentioned patent application. The differences over the earlier patent application as well as the advantages of the present invention will become more apparent hereinafter.

In producing electrical control devices, it is desirable for some purposes that thermistors associated therewith exhibit a specified relatively constant low resistance at room temperature and particularly in the range of from 0° C. to 60° C., a moderately higher resistance up to a selected intermediate temperature, for example up to some point in the range of 100° C. to 125° C., and a very high resistance of the order of 10,000 ohms and up to about 100,000 ohms, at some elevated temperature above such intermediate temperature. Furthermore, the positive temperature coefficient of resistance should be as great as is possible over a critical temperature range beginning at or about this selected intermediate temperature.

The object of the present invention is to provide novel positive temperature coefficient thermistor materials having characteristics such that at low temperatures the electrical resistivity is substantially constant over a rather wide range of temperatures and upon reaching a predetermined temperature, the electrical resistance increases abruptly so that in a range of a few degrees of temperature the electrical resistance will increase many times to a high value of over 10,000 ohms.

Another object of the invention is to prepare ceramic bodies having a marked positive temperature coefficient of electrical resistivity over a selected narrow range of temperatures, the body comprising a stoichiometric combination of a mixture of titanium dioxide and zirconium oxide, and one of the group consisting of barium oxide, barium strontium oxide and barium oxalates with controlled small amounts of rare earth metal oxides and a predetermined quantity of lead oxide added in excess of stoichiometry in order to produce a predetermined low temperature resistivity.

A still further object of the invention is to provide a process for preparing certain lead oxide containing barium zirconium titanate ceramic bodies so that the member will exhibit a marked positive temperature coefficient of resistivity within a relatively narrow range of temperatures.

Other objects of the invention will in part, be obvious and will, in part, appear hereinafter.

For a better understanding of the nature and scope of the invention, reference should be had to the following, in which:

Figure 1 is a view in elevation of a resistance member in accordance with the invention;

Fig. 2 is a graph plotting resistance against temperature of a body of composition in accordance with this invention and a body of similar composition without the addition of lead oxide in excess of stoichiometry; and Fig. 3 is a graph plotting voltage against current (power handling capacity) of a body of composition in accordance with this invention and a body of similar composition without the addition of lead oxide in excess of stoichiometry.

In accordance with the present invention, it has been discovered that positive temperature coefficient thermistor materials having exceptionally controllable resistances at any selected temperature may be prepared by combining certain ceramic forming components composed essentially of (A) one mol of a mixture of titanium dioxide and zirconium oxide in proportions providing from 1 mol percent to 25 mol percent of zirconium and from 99 mol percent to 75 mol percent of titanium and (B) a total of 1 mol of a mixture comprising (a) up to 0.997 mol of barium oxide or a barium oxide engendering barium salt, (b) at least one metal oxide selected from the group consisting of yttrium and cerium in proportions of from 0.003 to 0.03 mol and (c) from 0.1% to 1% by weight of lead oxide added in excess of stoichiometry. These components are intimately and homogeneously combined and fired in accordance with a schedule to be set forth hereinafter to produce a fired ceramic body which will not only exhibit (1) a predetermined high electrical resistance at a selected temperature, but (2) below this temperature and in the range of from 0° C. to 60° C. will exhibit a relatively constant low electrical resistance as compared to a body of similar composition without the addition of lead oxide in excess, while above this selected temperature it will rapidly increase in resistance in a matter of only a few degrees to an extremely high electrical resistance value. At the selected temperature where a given electrical resistance is desired, the thermistor materials of the present invention will have a positive temperature coefficient of resistance of an unusually high value so that in a matter of an interval some 25° C. the resistance will rise from a value of, for example, 1000 ohms to several tens of thousands ohms, and reaches a maximum resistance at about 200° C. of from about 50,000 to 75,000 ohms.

The presence of small amounts, of from 0.1 to 1% by weight, of lead oxide intimately admixed in the sintered compositions having the formula:

$$M_xBa_{(1-x)}Zr_yTi_{(1-y)}O_3$$

where M represents yttrium or cerium, x has a value 0.003 to 0.03, and y has a value of from .01 to .25, results in greatly improved positive temperature coefficient thermistor members. The room temperature resistance is quite uniform over a range of from 0° C. to 60° C. The knee of the temperature-resistance curve is sharpened. The rate of increase of resistance above 100° C. is higher than with similar compositions without lead. Uniformity of the properties from pellet to pellet from the same batch is higher. Good results will be obtained when lead oxide is present in amounts of from 0.2 to 0.7% of the weight of the fired composition. Exceptional results are had in the range of 0.40 to 0.60% of lead oxide.

In accordance with the present invention, there are produced members of a diameter of 0.375 inch and a thickness of 0.062 inch whose low temperature or room temperature resistance may be considerably less that 1000 ohms and preferably in the range of from 10 to several hundred ohms, while at intermediate temperatures of the order of 100° C. to 125° C., the resistance is of the order of 10 to 50 times that at room temperature and, in particular a 1000 ohm resistance is attained in this range of temperatures, along with a large positive temperature coefficient factor at or immediately above said intermediate temperature so that in a matter of 25° C. the resistance reaches a value of well over 10,000 ohms. Hereinafter members having the dimensions of 0.375 inch diameter by 0.062 inch length are specifically considered when reference is made to the electrical resistance thereof.

The ceramic thermistor compositions of the present invention comprise stoichiometric proportions of (A) a mixture of titanium dioxide and zirconium oxide in which the titanium comprises from 1 to 25 mol percent of the mixture and (B) an oxide from the group consisting of barium oxide and compounds engendering barium oxide when fired, admixed with a small but critical proportion of yttrium oxide or cerium oxide and from 0.1 to 1% of lead oxide (based on batch weight). The following general formula comprises the compositions of the present invention:

$$M_xBa_{(1-x)}Zr_yTi_{(1-y)}O_3 \cdot Z(PbO)$$

where M represents at least one rare earth metal from the group consisting of yttrium and cerium, x has a value of from 0.003 to 0.03, and y has a value of from 0.01 to 0.25, where Z represents a value of from 0.1 to 1% of the weight of the whole.

Good results have been had with a composition prepared in accordance with the following formula embodying yttrium:

$$Y_xBa_{(1-x)}Zr_yTi_{(1-y)}O_3 \cdot Z(PbO)$$

where x has a value of from 0.005 to 0.02 and y has a value of from 0.01 to 0.25, where Z represents a value of from 0.1 to 1% of the weight of the whole.

Unusually good results have been had with a composition prepared in accordance with the following formula embodying yttrium:

$$Y_{.015}Ba_{.985}Zr_{.06}Ti_{.94}O_3 \cdot Z(PbO)$$

with from .45 to 0.50% by weight of lead oxide intimately admixed therein.

In preparing the thermistors of the present invention, the titanium dioxide will ordinarily be employed as such, anatase being the preferred form thereof. The barium oxide may be introduced as barium oxide or barium carbonate. The yttrium oxide or cerium oxide may be added as the oxide, though the nitrate or oxalate salts thereof have given good results in practice. The zirconium oxide may be added as the monoclinic oxide or as zirconium chloride. The lead oxide may be introduced as lead oxide or as lead sulfate. Any lead oxide can be employed since at about 550° C. it will evolve excess oxygen and convert to lead monoxide (PbO). Also, lead hydroxide and lead carbonate or other lead compounds that will engender lead monoxide when heated in air may be employed. The compounds are preferably of a highly purified form and should contain less than 1% of non-volatile impurities. It will be appreciated that other compounds capable of producing the required oxides when heated may be employed in lieu of that set forth.

The correct proportions of the titanium dioxide, zirconium oxide, barium oxide or barium carbonate and the yttrium nitrate and lead oxide or lead sulfate, for example, are wet mixed with water in a porcelain ball mill using flint pebbles. Ball milling times of 2 to 6 hours have given an intimate homogeneous mixture. The resultant mixture is dried, for example by heating to 80° C. and the resultant mud is then calcined in air at 1000° C. for 2 hours. The calcining may be carried out in a refractory crucible, for example one made out of zirconia or zircon. It will be understood that the calcining may be carried out for a shorter period of time of for example, 30 minutes or for longer periods of times of up to a day. The temperature given is not critical but may be varied from 900° C. to 1200° C.

The calcined product is then ball milled in water in a porcelain ball mill, employing flint pebbles, for a period of time of up to 16 hours. The resulting fine suspension is then dried completely and recrushed to pass through a 200 mesh sieve. The resultant powder may be admixed with a small amount of an organic binder such, for example, as a dilute solution of polyvinyl alcohol or some other water soluble organic binder, following the practices known in the ceramic industry. The organic binder enables the powder to be compacted in a pellet forming machine to a pellet of a size and shape desired for the thermistor body. Good results have been obtained when pressures of from about 5000 to 50,000 pounds per square inch were applied to the oxide powder.

The pressed pellets are then first sintered in an inert atmosphere, for example argon gas, at a temperature of from 1300° C. to 1550° C. while being supported on an inert zirconia refractory plate. A period of from a fraction of an hour to 10 hours may be employed. Thereafter the sintered bodies are heat treated in an oxidizing atmosphere such as air, at a temperature of from 1000° C. to 1300° C. for a period of the order of 1 hour. The last step of heat treating or aging in air is critical in imparting desired resistance temperature characteristics to the thermistor members of the present invention. It will be appreciated that the sintering in the inert gas and the subsequent aging in air, may be carried out in the same furnace by replacing the argon, for example, with a flow of air or oxygen, after the initial heating from 1300° C. to 1550° C.

The sintered and air heat treated bodies are then treated to apply to spaced portions thereof electrical contacts. An ultrasonic process employing a solder comprising indium, lead and silver, for example, 10% indium, 10% silver and 80% lead is satisfactory. Also, flame sprayed contacts may be applied as disclosed in copending application, Serial No. 15,599, filed March 17, 1960. Electrical leads may then be soldered to the contacts so applied.

Referring to Fig. 1 of the drawings, there is shown a thermistor device 10 which comprises a ceramic body 12 prepared as disclosed herein, of the vitrified and aged ceramic composition of this invention. To the upper face of the body 12 is affixed a contact layer 14 composed of a suitable metal or alloy or other good electrical conducting material into ohmic contact with the body 12. It will be understood that the layer 14 may be applied by soldering, brazing or other suitable techniques providing, however, that there be a very low resistance between the surfaces of the body 12 and the layer 14. A suitable electrical lead 16 is affixed to the layer 14. Similarly, a counterelectrode 18 is affixed to the lower surface of the body 12 and carries an electrical lead 20. It will be understood that the shape and dimensions of the ceramic body 12 will be dependent of the application, the desired ohmic resistance and the like. For many applications the body 12 will be a circular cylinder.

The position of the intermediate temperature at which is obtained a resistance of the order of 1000 ohm for an 0.375 inch diameter by 0.062 inch long member is readily controlled by varying the zirconium oxide to the titanium dioxide ratio. As the proportion of zirconium oxide increases from 1 to 25 mol percent, the titanium dioxide decreasing from 99 to 75 mol percent, the thousand ohm resistance point decreases from about 120° C. to 15° C.

The following examples illustrate the practice of the invention.

*Example I*

Titanium dioxide and zirconium dioxide were admixed in mol proportions of 0.94 and 0.06, respectively. To this mixture was then added .985 mol of barium carbonate, 0.015 mol of yttrium nitrate and sufficient lead sulfate, about 0.64% of the weight of the batch, to yield 0.47% by weight, of lead oxide based on fired batch weight. These ingredients were wet mixed in water in a porcelain ball mill for 4 hours. The resulting slurry was allowed to settle and the supernatant water was evaporated and the resulting mud was then dried at 80° C. in air. The dry powder so produced was placed in a zirconia crucible and heated in a furnace while exposed to the atmosphere for 2 hours at a temperature of 1000° C. The resulting calcine product was then placed in the porcelain ball mill and was wet milled in water using flint pebbles for 8 hours. The resulting slurry was dried at 80° C. and the resulting dry product was then pulverized mechanically and screened through a 200-mesh sieve. The screen powder was admixed with an emulsion of polyvinyl alcohol in the proportion of 100 grams of the powder to 20 cc. of a 10% aqueous emulsion of the polyvinyl alcohol. The powder mixture was then pressed at a pressure of 15,000 p.s.i. into a cylindrical pellet. The pellet was sintered in an argon atmosphere at 1350° C. for 2 hours while supported on a zirconia plate. The resulting vitrified cylinder was then placed within a furnace in which air circulated and was heat treated in the air at 1200° C. for 1 hour.

The resulting sintered cylindrical body was of 0.375 inch diameter and 0.062 inch long, was then coated at both ends of the cylinder with an alloy of indium, lead and silver applied ultrasonically at a temperature of 310° C. Electrodes were then soldered to the solder layer so applied at each end of the cylinder.

The resistance characteristics of a group of pellets of the resulting thermistor element were determined over a range of temperatures and the curve of Fig. 2 in which the vertical ordinate scale is changed twice, was plotted from this test and for comparison includes the curve of a thermistor element of the same stoichiometric combination without lead oxide. The knee B of the curve from 60° C. to 100° C., is much more pronounced in the pellets of the composition of the present invention while the knee of the previous composition is not as square, though at 100° C. the resistance was approximately 500 ohms as compared to 620 ohms for the element without lead oxide. For the present invention, at room temperature (25° C.) the resistance was 50 ohms and this resistance was relatively constant over the range A of from 0° C. to 60° C., while the lead-free composition varied considerably in resistance over the same temperature range. It will be observed that at 100° C. the positive temperature coefficient is extremely high so that in a temperature interval of less than 10° C. the resistance tripled. The rate of increase of resistivity per degree above 100° C. is much greater for the present composition. The maximum resistance for the present composition, obtained at approximately 210° C., was 75,000 ohms.

The maximum power handling capacity of the thermistor element of Example I and of the comparable lead-free composition was determined at room temperature and the curves of Fig. 3 of the drawing were plotted from these tests. As may be seen by the curves, the addition of lead oxide increases the power handling capacity of the element from 0.36 watt to 0.51 watt (maximum power dissipated in the device at room ambient (25° C.) before the onset of self-heating).

*Example II*

The process of Example I was followed, substituting cerium nitrate for the yttrium without zirconium dioxide, and the final fired pellets had a composition of the formula:

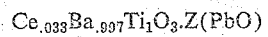
$Ce_{.003}Ba_{.997}Ti_1O_3.Z(PbO)$

The average electrical resistance of the pellets of this example at 25° C. was from 16 to 20 ohms, while at 100° C. it was 130 ohms.

By following the procedure of Example I, pellets can be prepared from mixtures of cerium and yttrium salts, to produce compositions having for example, the formula:

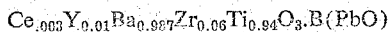
$Ce_{.003}Y_{.01}Ba_{.987}Zr_{.06}Ti_{.94}O_3.B(PbO)$

In each of the examples, the pellets of this invention were prepared in large batches, usually several hundred and the tests were made on groups of from 20 to 40. The individual pellets were of surprisingly uniform electrical resistance at, for example, 100° C., varying very slightly, though at room temperature (25° C.) the resistance values of all the pellets had more spread, often varying in the range of from 30 to 50 ohms, though each pellet was constant from 0 to 60° C. The electrical resistance was determined by employing a direct current of 5 milliamperes.

It will be understood that the present specification and drawing are only illustrative and not limiting.

The claims are:

1. A thermistor body comprising the sintered composition $M_xBa_{(1-x)}Zr_yTi_{(1-y)}O_3$ with from 0.01% to 1% by weight of lead oxide intimately admixed therein, where M represents at least one rare earth metal from the group consisting of yttrium and cerium, $x$ has a value of from 0.003 to 0.03, and $y$ has a value of from 0.01 to 0.25.

2. A thermistor body comprising the sintered composition $Y_xBa_{(1-x)}Zr_yTi_{(1-y)}O_3$ with from 0.2% to 0.7% by weight of lead oxide intimately admixed therein, where $x$ has a value of from 0.005 to 0.02 and $y$ has a value of from 0.01 to 0.25.

3. A thermistor body comprising the sintered composition $Ce_xBa_{(1-x)}Zr_yTi_{(1-y)}O_3$ with from 0.2% to 0.7% by weight of lead oxide intimately admixed therein, where $x$ has a value of from 0.003 to 0.03, and $y$ has a value of from 0.01 to 0.25.

4. A thermistor body comprising the sintered composition $Y_{.015}Ba_{.985}Zr_{.07}Ti_{.94}O_3$ with from 0.4% to 0.6% by weight of the body of lead oxide intimately admixed therein.

5. A thermistor body comprising the sintered composion $Y_{.015}Ba_{.985}Zr_{.06}Ti_{.94}O_3$ with from 0.45 to 0.5% by weight of lead oxide intimately admixed therein.

6. A thermistor body comprising a pellet of a composition consisting of an intimately sintered admixture of $Y_xBa_{(1-x)}Zr_yTi_{(1-y)}O_3$ with from 0.2% to 0.7% by weight of lead oxide intimately admixed therein, where $x$ has a value of from 0.005 to 0.02 and $y$ has a value of from 0.01 to 0.25, the pellet of the composition having been initially sintered at a temperature of from 1300° C. to 1550° C. in an inert atmosphere and then fired in air at a temperature of from 1000° to 1300° C. for a period of the order of an hour.

7. A thermistor body comprising a pellet of a composition consisting of an intimate admixture of

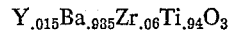

$Y_{.015}Ba_{.985}Zr_{.06}Ti_{.94}O_3$ with from 0.4 to 0.6% by weight of lead oxide, the pellet of the composition having been initially sintered at a temperature of from 1300° C. to 1550° C. for a period of the order of an hour in an inert atmosphere and then fired in air at a temperature of from 1000° C. to 1300° C. for a period of the order of an hour.

8. The process for producing a thermistor body comprising intimately admixing an oxide of barium, titanium dioxide, zirconium dioxide, at least one oxide of the group consisting of yttrium and cerium, and lead sulfate in proportions to produce a composition of the formula $M_xBa_{(1-x)}Zr_yTi_{(1-y)}O_3$ with from 0.01% to 1% by weight, of lead oxide intimately admixed therein, where M represents at least one rare earth metal from the group consisting of yttrium and cerium, $x$ has a value of from 0.003 to 0.03, and $y$ has a value of from 0.01 to 0.25, calcining the admixture to decompose any compounds so that only the oxides of the elements remain and to partially react the residual oxides into the composition, milling the partially reacted composition into a finely divided state, forming compacts of the finely divided composition under pressure and sintering the compacts initially at a temperature of from 1300° C. to 1550° C. in an inert atmosphere for a period of the order of an hour and then in an oxidizing atmosphere at a temperature of from 1000° C. to 1300° C. for a period of the order of an hour.

9. The process for producing a thermistor body comprising intimately admixing an oxide of barium, titanium dioxide, zirconium dioxide, at least one oxide of the group consisting of yttrium and cerium, and lead sulfate in proportions to produce a composition of the formula $Y_xBa_{(1-x)}Zr_yTi_{(1-y)}O_3$ with from 0.2% to 0.7% by weight of lead oxide intimately admixed therein, where $x$ has a value of from 0.005 to 0.02 and $y$ has a value of from 0.01 to 0.25, calcining the admixture to decompose any compounds so that only the oxides of the elements remain and to partially react the residual oxides into the composition, milling the partially reacted composition into a finely divided state, forming compacts of the finely divided composition under pressure and sintering the compacts initially at a temperature of from 1300° C. to 1550° C. in an inert atmosphere for a period of the order of an hour and then in an oxidizing atmosphere at a temperature of from 1000° C. to 1300° C. for a period of the order of an hour.

10. The process for producing a thermistor body comprising intimately admixing an oxide of barium, titanium dioxide, zirconium dioxide, at least one oxide of the group consisting of yttrium and cerium, and lead sulfate in proportions to produce a composition of the formula $Y_{.015}Ba_{.985}Zr_{.06}Ti_{.94}O_3$ with from 0.4% to 0.6% by weight of the body of lead oxide intimately admixed therein, calcining the admixture to decompose any compounds so that only the oxides of the elements remain and to partially react the residual oxides into the composition, milling the partially reacted composition into a finely divided state, forming compacts of the finely divided composition under pressure and sintering the compacts initially at a temperature of from 1300° C. to 1550° C. in an inert atmosphere for a period of the order of an hour and then in an oxidizing atmosphere at a temperature of from 1000° C. to 1300° C. for a period of the order of an hour.

References Cited in the file of this patent

UNITED STATES PATENTS

| | | |
|---|---|---|
| 2,398,088 | Ehlers et al. | Apr. 9, 1946 |
| 2,432,250 | Rath | Dec. 9, 1947 |
| 2,434,236 | Verwey et al. | Jan. 6, 1948 |
| 2,616,813 | Klasens | Nov. 4, 1952 |
| 2,689,186 | Day | Sept. 14, 1954 |
| 2,776,898 | Day et al. | Jan. 8, 1957 |
| 2,911,370 | Kulcsar | Nov. 3, 1959 |

FOREIGN PATENTS

| | | |
|---|---|---|
| 714,965 | Great Britain | Sept. 8, 1954 |
| 780,735 | Great Britain | Aug. 7, 1957 |